US008662746B2

(12) United States Patent
Subramanian et al.

(10) Patent No.: US 8,662,746 B2
(45) Date of Patent: Mar. 4, 2014

(54) TURBINE COMPONENT INSTRUMENTED TO PROVIDE THERMAL MEASUREMENTS

(75) Inventors: Ramesh Subramanian, Oviedo, FL (US); Anand A. Kulkarni, Oviedo, FL (US); Vinay Jonnalagadda, Orlando, FL (US); David J. Mitchell, Oviedo, FL (US)

(73) Assignee: Siemens, Energy Inc., Orlando, FL (US)

( * ) Notice: Subject to any disclaimer, the term of this patent is extended or adjusted under 35 U.S.C. 154(b) by 384 days.

(21) Appl. No.: 13/015,822

(22) Filed: Jan. 28, 2011

(65) Prior Publication Data
US 2011/0222582 A1   Sep. 15, 2011

Related U.S. Application Data

(63) Continuation-in-part of application No. 12/327,058, filed on Dec. 3, 2008, now Pat. No. 8,033,722.

(60) Provisional application No. 61/085,645, filed on Aug. 1, 2008, provisional application No. 61/085,654, filed on Aug. 1, 2008, provisional application No. 61/299,742, filed on Jan. 29, 2010.

(51) Int. Cl.
*G01K 7/02* (2006.01)
*G01J 5/00* (2006.01)

(52) U.S. Cl.
USPC ........... 374/141; 374/179; 374/121; 374/137; 374/148; 374/153; 374/29

(58) Field of Classification Search
USPC ............. 374/1, 121, 130, 161, 141, 137, 166, 374/29, 30, 112, 114, 115, 109, 45, 57, 4, 7, 374/179, 181, 182; 136/200, 232, 233; 250/338.1, 330, 341.6
See application file for complete search history.

(56) References Cited

U.S. PATENT DOCUMENTS

| | | | | |
|---|---|---|---|---|
| 3,307,402 A | * | 3/1967 | Richardson | 374/181 |
| 3,327,517 A | * | 6/1967 | Huffman | 374/1 |
| 3,514,998 A | * | 6/1970 | Benson | 73/204.19 |

(Continued)

FOREIGN PATENT DOCUMENTS

| | | |
|---|---|---|
| EP | 1494020 A1 | 1/2005 |
| GB | 2439389 | 12/2007 |
| WO | WO 200/112140 A3 | 11/2005 |

OTHER PUBLICATIONS

D.D. Edwards, et al, A New Transparent Conducting Oxide in the Ga2O3-In2O30-SnO2 System, American Institute of Physics, Mar. 31, 1997, p. 1706, App. Phys. Lett. 70 (13).

(Continued)

*Primary Examiner* — Gail Verbitsky (57) ABSTRACT

A gas turbine component (49) may be instrumented to provide a plurality of signals indicative of thermal measurements in a high temperature combustion environment of the gas turbine. A thermocouple arrangement may include a first thermocouple leg (50) disposed within a thickness of the component. At least two or more thermocouple legs (52, 53, 54) is each electrically connected to the first leg to form individual thermocouple junctions (56, 57, 58, 59) along the first leg for conversion of respective thermal gradients to respective electrical signals, such as electromotive force (emf) based voltages. The thermocouple arrangement may be used in combination with a thermographic system (70) to calculate heat flux over a region of the turbine component.

18 Claims, 5 Drawing Sheets

(56) References Cited

U.S. PATENT DOCUMENTS

| | | | |
|---|---|---|---|
| 4,242,907 A * | 1/1981 | Kazmierowicz | 374/113 |
| 4,480,930 A | 11/1984 | DeZubay et al. | |
| 4,595,298 A | 6/1986 | Frederick | |
| 4,969,956 A | 11/1990 | Kreider et al. | |
| 5,188,457 A * | 2/1993 | O'Hara | 374/104 |
| 6,190,040 B1 * | 2/2001 | Renken et al. | 374/185 |
| 6,582,425 B2 | 6/2003 | Simpson | |
| 6,742,295 B2 * | 6/2004 | Gross | 40/711 |
| 6,857,776 B2 | 2/2005 | Park | |
| 6,991,370 B2 | 1/2006 | Kofune et al. | |
| 7,003,425 B2 * | 2/2006 | Bird et al. | 702/136 |
| 7,004,622 B2 * | 2/2006 | Hardwicke et al. | 374/141 |
| 7,118,271 B2 * | 10/2006 | Schonlein et al. | 374/2 |
| 7,175,343 B2 * | 2/2007 | Phillips | 374/180 |
| 7,368,827 B2 * | 5/2008 | Kulkarni et al. | 290/52 |
| 7,632,012 B2 * | 12/2009 | Twerdochlib | 374/129 |
| 7,651,261 B2 * | 1/2010 | Bunker et al. | 374/43 |
| 7,690,840 B2 | 4/2010 | Zombo et al. | |
| 7,753,584 B2 * | 7/2010 | Gambino et al. | 374/179 |
| 7,994,416 B2 * | 8/2011 | Schuh | 136/230 |
| 8,004,423 B2 * | 8/2011 | Mitchell et al. | 340/870.17 |
| 8,109,670 B2 * | 2/2012 | Al-Misfer | 374/139 |
| 2002/0022834 A1 | 2/2002 | Simpson | |
| 2002/0026183 A1 | 2/2002 | Simpson | |
| 2004/0114666 A1 | 6/2004 | Hardwicke et al. | |
| 2005/0198967 A1 | 9/2005 | Subramanian | |
| 2008/0054645 A1 | 3/2008 | Kulkarni et al. | |
| 2009/0312956 A1 * | 12/2009 | Zombo et al. | 702/34 |
| 2010/0027584 A1 | 2/2010 | Kulkarni et al. | |
| 2010/0224772 A1 * | 9/2010 | Lemieux et al. | 250/252.1 |
| 2010/0226756 A1 | 9/2010 | Mitchell | |
| 2010/0226757 A1 | 9/2010 | Mitchell | |
| 2011/0023619 A1 * | 2/2011 | Gregory et al. | 73/774 |
| 2011/0280279 A1 * | 11/2011 | Gregory et al. | 374/152 |

OTHER PUBLICATIONS

Roy G. Gordon, Criteria for Choosing Transparent Conductors, MRS Bulletin, Aug. 2000, p. 52, See www.mrs.org/publications/bulletin.

After Cerac Corporation, ITO, Tin-Doped Indium Oxide for Optical Coating, (2002). See www.cerac.corporation.com/pubs/proddata/ito.htm.

J.E. Medvedeva, Unconventional approaches to combine optical transparency with electrical conductivity, Apr. 11, 2007, Department of Physics, University of Missouri, Rolla, Rolla, MO, 65409.

Tadatsugu Minami, Present status of transparent conducting oxide thin-film development for Indium-Tin-Oxide (ITO) substitutes, Science Direct, 2007, See www.sciencedirect.com.

Andrea Ambrosini, et al, Electrical, Optical and Structural Properties of Tin-Doped $In_2O_3$-$M_2O_3$ Solid Solutions (M=Y, Sc), Jun. 27, 2000, Journal of Solid State Chemistry, Issue 53, pp. 41-47.

A. Amaral, et al, Influence of the Initial Layers on the Optical and Electrical Properties of ITO Films, 2001. Optical Materials, 17, pp. 291-294.

Kenneth R. Poeppelmeir, Enabling Photovoltaic Materials: Rational Syntheses and Properties of Transparent Conductors, 10th International Workshop on "Functional Oxides" Caen Jul. 3-4, 2006.

Moshe Yust, et al; "Transparent Thin Film Thermocouple"; Electronics and Optics; Thin Solid Films, Sep. 1, 1989; pp. 73-78; vol. 176, No. 1; XP025831215; ISSN: 0040-6090.

* cited by examiner

TURBINE COMPONENT INSTRUMENTED TO PROVIDE THERMAL MEASUREMENTS

RELATED APPLICATIONS

This is a continuation-in-part application of U.S. patent application Ser. No. 12/327,058, filed on Dec. 3, 2008, now U.S. Pat. No. 8,033,722 which in turn claims benefit of the Aug. 1, 2008, filing date of U.S. Provisional Application 61/085,645 and U.S. Provisional Application 61/085,654. This application further claims benefit of the Jan. 29, 2010, filing date of U.S. Provisional Application 61/299,742. Each of the foregoing applications is incorporated by reference herein.

FIELD OF THE INVENTION

The present invention generally relates to gas turbines and, more particularly, to a gas turbine component instrumented to provide a plurality of signals indicative of thermal measurements in a high temperature combustion environment of the gas turbine.

BACKGROUND OF THE INVENTION

There is an increasing demand for real-time measurement of the structural integrity of critical moving components in modern gas turbines, which operate at ultra high temperatures. Moreover, requirements for gas turbines in the future call for ever higher operating temperatures. However, the harsh turbine environment encountered in these turbines along with the lack of long-term demonstrated sensor functionality, make it difficult to meet these objectives. The materials exposed to the hot gas path are being operated more closely to their design margins, which require the development of accurate and reliable sensors for monitoring the materials' condition during operation. While life prediction tools utilize laboratory generated data, active monitoring with embedded sensors enable a better understanding of the physics of material failure, loss of functionality due to material degradation, and coating delamination or cracking or spalling. The turbine typically includes a wide range of component materials with varied exposure to high temperatures and high centrifugal forces on rotating elements, and it is often surrounded by highly conductive metallic materials.

A temperature sensor with demonstrated reliability is a thermocouple. In principle, when two conductors made of dissimilar metals are joined at both ends, a thermoelectric circuit is formed. When one of the ends of this circuit is heated, there is a continuous current that flows in the thermoelectric circuit. Thomas Seebeck made this discovery in 1821. If this circuit is broken at the center, the hot open circuit voltage (the Seebeck voltage) is a function of the junction temperature and the composition of the two metals. Such a circuit is known as a thermocouple.

Most prior art thermocouples are made of wire. For example, a standard thermocouple, such as a Type S thermocouple, is made of a pure platinum wire for one wire leg and an alloy of approximately 90% platinum and 10% rhodium for the second wire leg. Another example of a standard prior art thermocouple is a Type R thermocouple, which has one wire leg made of an alloy consisting of 95% platinum and 5% rhodium, while the second wire leg is made of an alloy consisting of 87% platinum and 13% rhodium. These alloy combinations work well when the thermocouples are made of wire wherein the percent of the constituents along the length of the wire are consistent. This is not necessarily the case when the thermocouple legs are deposited in thin-film structures. For example, when an alloy (e.g., platinum-10% rhodium) is deposited, compositional variations along the length of the thermocouple leg will occur. That is to say, the 10% rhodium will not be evenly distributed everywhere, which will cause a deviation in the performance of the thermocouple.

Accordingly, there is a need for a thermocouple that is reliable and that can withstand the harsh environment of a gas turbine. While the thermocouple needs to function in a turbine hot gas path section where temperatures may be greater than 1300° C., it is also desired that the thermocouple has minimal impact on the performance or life of the component.

BRIEF DESCRIPTION OF THE DRAWINGS

Aspects of the invention are explained in the following description in view of the drawings that show.

DETAILED DESCRIPTION OF THE INVENTION

With the development of thin-film techniques it is recognized that there are several advantages of thin-film thermocouples over the standard wire thermocouples for measuring solid surface temperatures. Their low mass provides a very rapid response, the thinness of the film does not disturb the convective heat transfer characteristics of the surface compared to a wire sensor, and the small size is quite compatible with complex electronic fabrication techniques. Moreover, the low mass of the thin-film sensor, when attached to a turbine component, does not create problems with centrifugal forces placed on the thermocouple by turbine rotation. Furthermore, the thin-film sensor allows conformance to the non-planar surfaces of turbine components. Additionally, thin-film sensor implementation on critical moving components in the harsh turbine environment provides an excellent source of data for condition-based monitoring during operation. These thermocouples provide a real-time temperature profile that enables reliability monitoring of the part in service. One such family of thin-film sensors is a monoelemental thermocouple. A mono-elemental thermocouple has two legs each made of a different single-element material (e.g., precious metals like platinum, palladium, rhodium, or iridium). In other words, a monoelemental thermocouple does not use legs of alloyed wire as in the Type S and Type R wire thermocouples.

Pure platinum and pure palladium metals for the two legs of the thermocouple may be used due to the minimal mismatch of their CTE with that of an underlying ceramic thermal barrier coating (TBC) deposited on the turbine component (e.g., a blade). Also, due to the purity of these metals (i.e., they are monoelemental), there is very little chemical variation along the length of the deposited thermocouple lines to contribute to a variation in the performance of the thermocouple. The term "pure" or "monoelemental" as used herein means a purity level of at least 99 wt. percent. Additional advantages of using these metals include their excellent oxidation properties and high melting point (e.g., platinum is 1769° C.), which allows the thermocouple to be deposited on the top surface of the TBC where it may be exposed directly to the hot combustion gas path environment.

Figure 1:
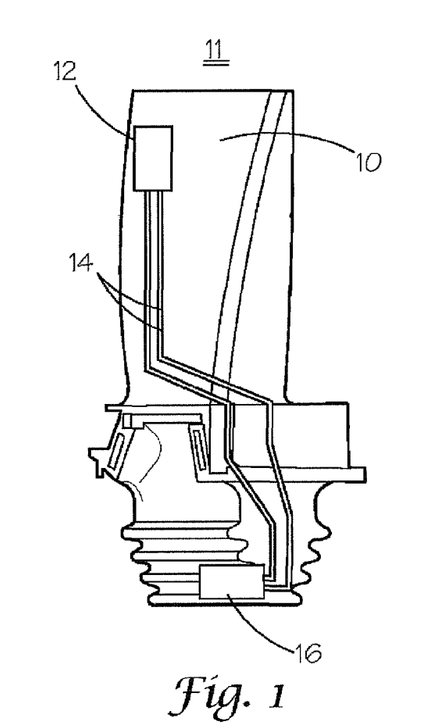
FIG. 1 is a perspective view of a turbine blade having a sensor, such as a thermocouple, formed thereon.

One example instrumented moving turbine component that would enable collection of real-time temperature data is shown in FIG. 1, wherein a turbine blade 10 of a gas turbine 11 has mounted thereon a thermocouple 12 and conductors 14 leading to circuitry 16, which processes and transmits data derived from the thermocouple 12 to a receiver circuit (not shown) external the turbine 11. An example circuitry 16 is disclosed in published U.S. Patent Application Publication No US 2005/0198967 A1, titled SMART COMPONENT FOR USE IN AN OPERATING ENVIRONMENT.

Figure 2:
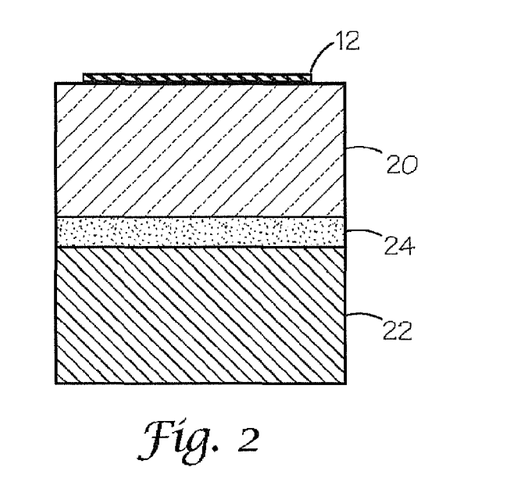
FIG. 2 is cross-sectional view of a portion of the turbine blade showing a thin-film thermocouple in accordance with aspects of the present invention formed on the thermal barrier coating on the blade.

Referring now to FIG. 2, a cross-sectional view of a portion of the turbine blade 10 is shown having mounted thereon a thin-film thermocouple 12 in accordance with one example embodiment of the present invention, which is formed atop the TBC 20 covering the metal blade. The underlying substrate 22 of the blade 10 may have formed thereon a bond coat 24, which separates the TBC 20 from the substrate and ensures a good bond between the two.

Figure 3:
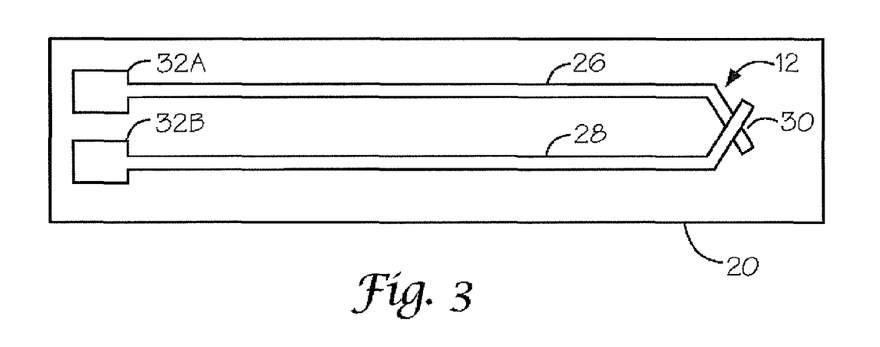
FIG. 3 is a planar view of the thin-film thermocouple in accordance with aspects the present invention.

FIG. 3 is a plan view of the thermocouple 12, in accordance with one example embodiment. A first leg 26 may be formed of pure platinum and a second leg 28 may be formed of pure palladium. First ends of the two legs 26 and 28 are joined together at a point 30, which makes ohmic contact between these two legs and forms a hot junction for conversion of heat into an electrical signal (i.e., the Seebeck voltage). Bonding pads 32A and 32B are formed on the other ends of the legs 26 and 28, respectively, which allow for the making of electrical contact with the conductors 14 to transmit the electrical signal (i.e., Seebeck voltage) to the circuitry 16.

Another consideration in a high-temperature turbine environment (e.g., greater than 800° C.) is the dielectric/ionic conductivity of the TBC material. The standard TBC, which is made from yttria stabilized zirconia, may lose its dielectric strength above 800° C. Accordingly, there may be a need for a ceramic insulator coating 34 (FIG. 4A) to electrically insulate the thermocouple 12 from the TBC 20, which insulator coating typically may provide a dielectric strength (high temperature resistance of greater than 0.5 mega ohms) above 1100° C. Various oxides may be capable of retaining such strength at high temperatures. One example composition of interest may be yttrium aluminum garnet ("YAG"), which may be deposited with a thickness in a range from 50 microns to 250 microns and has demonstrated excellent performance of the thermocouple at high temperatures (e.g., above 1100° C.).

Figure 4A:
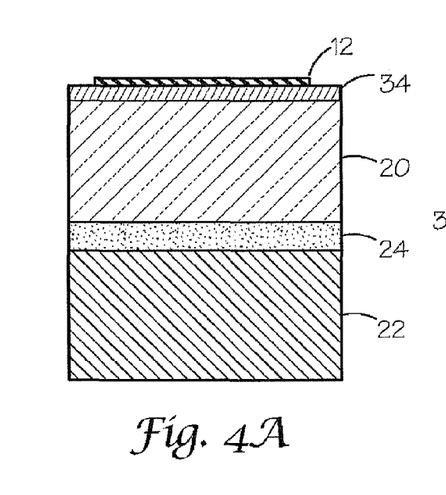
FIG. 4A is a cross-sectional view of a portion of the turbine blade showing a thermocouple in accordance with an example embodiment of the present invention formed over a high temperature dielectric on the thermal barrier coating (TBC) on the blade.
Figure 4B:
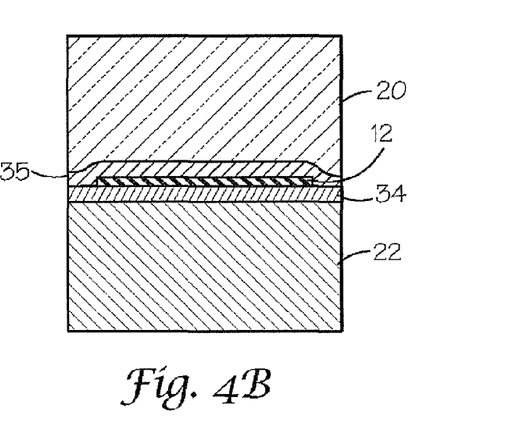
FIG. 4B is a cross-sectional view of a portion of the turbine blade showing a thermocouple in accordance with an example embodiment of the present invention formed over a high temperature dielectric deposited directly onto the blade's substrate and beneath the TBC layer.

A cross-sectional view of the dielectric insulator coating 34 on the TBC 20 is shown in FIG. 4A. In particular, the dielectric insulator coating 34 physically and electrically separates the thermocouple 12 from the TBC 20. An alternate embodiment of the invention is shown in FIG. 4B which illustrates another portion of the turbine blade wherein the dielectric insulator coating 34 may be deposited directly onto the substrate 22 and the thermocouple 12 is deposited over this dielectric insulator coating. Also, another dielectric insulator coating 35 (such as of the same material and thickness) may be deposited over the thermocouple 12 if needed. Finally, the TBC layer 20 may be deposited over the dielectric insulator coating 35 (or directly over the thermocouple). Accordingly, thermocouple 12 may be embedded in the structure to directly sense the temperature of the component substrate 22, for example.

Figure 4C:
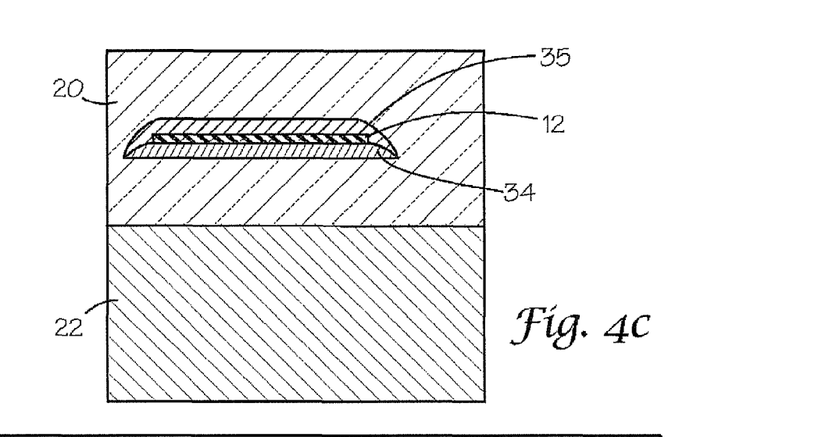
FIG. 4C is a cross-sectional view of a portion of the turbine blade showing a thermocouple in accordance with an example embodiment of the present invention formed within the TBC layer.

FIG. 4C is an example embodiment which illustrates yet another portion of the turbine blade wherein the thermocouple 12 is embedded within the TBC layer 20 and is electrically insulated from contact with the TBC material 20 by layers of electrically insulating material 34, 35 in order to provide a measurement of the temperature within the TBC layer 20. Such structures may be formed by thermally spraying the respective materials as the TBC layer 20 is formed in a conventional manner.

Figure 5:
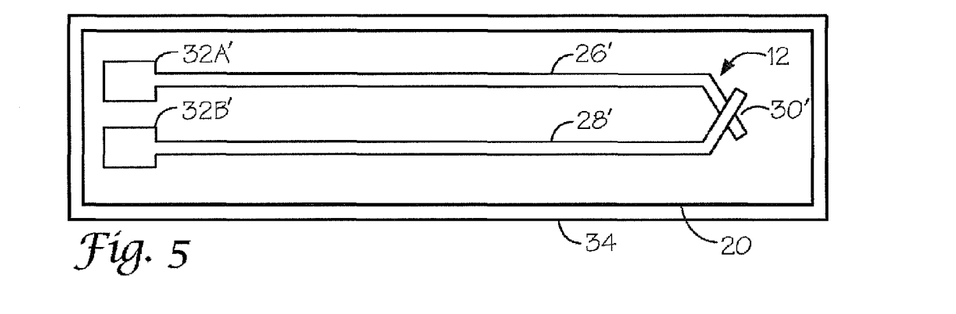
FIG. 5 is a planar view of the thin-film thermocouple deposited over the high temperature dielectric over or beneath the TBC layer in accordance with aspects of the present invention.

FIG. 5 is a plan view of the thermocouple 12 of FIG. 4A, wherein in accordance with an example embodiment a first leg 26' may be formed of pure platinum and a second leg 28' may be formed of pure palladium. The two legs 26' and 28' are joined together at a point 30', which makes ohmic contact between the two legs. Bonding pads 32A' and 32B' are formed on the other end of the legs 26' and 28', respectively, which allows for making electrical contact with the conductors 14.

Figure 6:
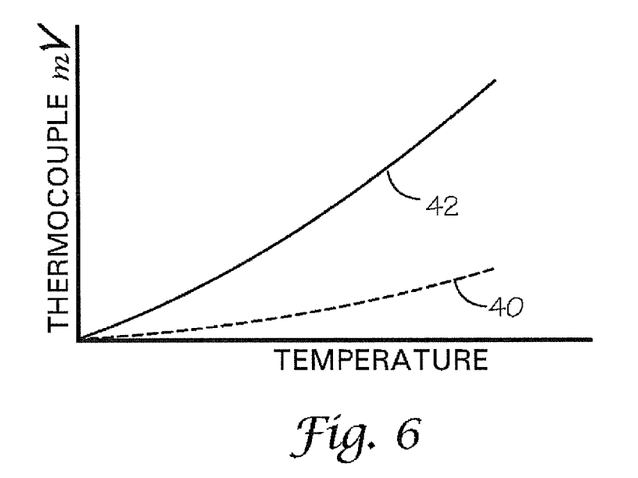
FIG. 6 is a graph showing example performance of the monoelemental thermocouple as temperature increases.
Figure 7:
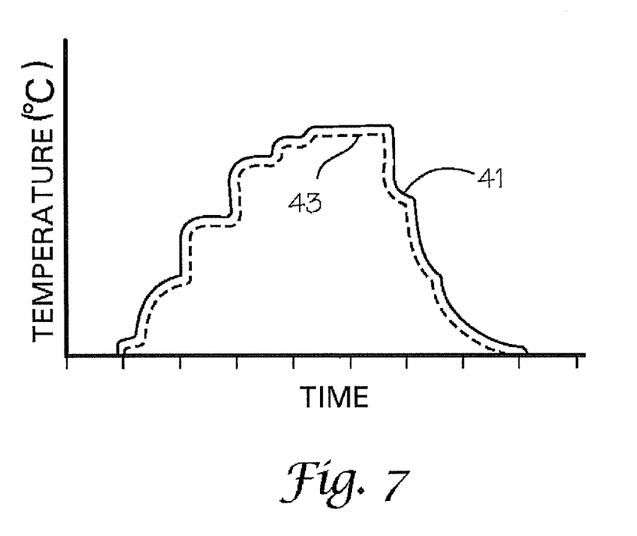
FIG. 7 is a graph showing example performance of the monoelemental thermocouple compared with a standard Type S type thermocouple.

FIG. 6 is a graph showing an example performance (curve 40) of the monoelemental thermocouple. As temperature increases, the thermocouple voltage (Seebeck voltage in my) increases substantially linearly. The example performance of these thermocouples is shown in FIG. 7 by curve 41, with comparison to standard Type S thermocouples (curve 43). In this configuration, the monoelemental thermocouple performance is within 3 degrees of the Type S thermocouple, which exhibits an excellent correlation.

The legs 32A and 32B (or 32A' and 32B') and the conductors 14 may be deposited on the blade 10 by any of various deposition techniques, such as Air Plasma Spraying (APS), High Velocity Oxy Fuel (HVOF), mini HVOF, solution plasma spraying, or cold spray either directly or by advanced masking or gun nozzle designs. Other example deposition techniques may be Electron Beam Physical Vapor Deposition (EBPVD), Chemical Vapor Deposition (CVD), pulsed laser deposition, mini-plasma, direct write, solution or gas based deposition processes. In one example embodiment, the legs of the thermocouple 12 may have a thickness in a range from 25 microns to 150 microns. In another example embodiment, the legs of the thermocouple 12 may have a thickness in a range from 50 microns to 100 microns. In one example embodiment the legs of the thermocouple 12 may have a width ranging from 0.25 mm to 4 mm. In another example embodiment the legs of the thermocouple 12 may have a width ranging from 0.5 mm to 2 mm.

It will be appreciated by one skilled in the art that the cross-sectional illustrations of FIGS. 2, 4A 4B and 4C may be considered to show either a planar substrate or curved or non-planar surface as found on most turbine components.

In accordance with an alternate example embodiment of the invention, the second leg 28 or 28' may be replaced with a transparent conducting oxide (TCO), while the first leg 26 or 26' remains pure platinum. Such TCO provides a good thermoelectric response with platinum as the first leg, mainly due to their excellent electrical conductivity. Another advantage is their chemical stability. Examples of such oxides are $CuAlO_2$, $In_2O_3$—$SnO_2$, $In_2O_3$—$SnO_2$ doped with ZnO, $Ga_2O_3$, $CdIn_2O_4$, $Cd_2SnO_4$, and ZnO. This alternate embodiment would be optimum for environments where the temperature exceeds 1550° C. because pure palladium begins to soften and oxidize above this temperature. An example performance curve for a pure platinum-oxide thermocouple is depicted by curve 42 in FIG. 6.

A method of manufacturing a thin film thermocouple on a non-planar surface of a turbine component may include the following example steps: laser cutting a first mask and shaping the first mask to conform with a non-planar surface, the first mask including a pattern opening defining a first element of the thermocouple; depositing a first conductor in the pattern opening of the first mask; laser cutting a second mask and shaping the second mask to conform with the non-planar surface, the second mask including a pattern opening defining a second element of the thermocouple; and depositing a second conductor in the pattern opening of the second mask.

The description below builds upon some of the basic structural and operational aspects described so far and therefore will try to spare the reader from burdensome and unnecessary repetition of details which are already described.

Figure 8:
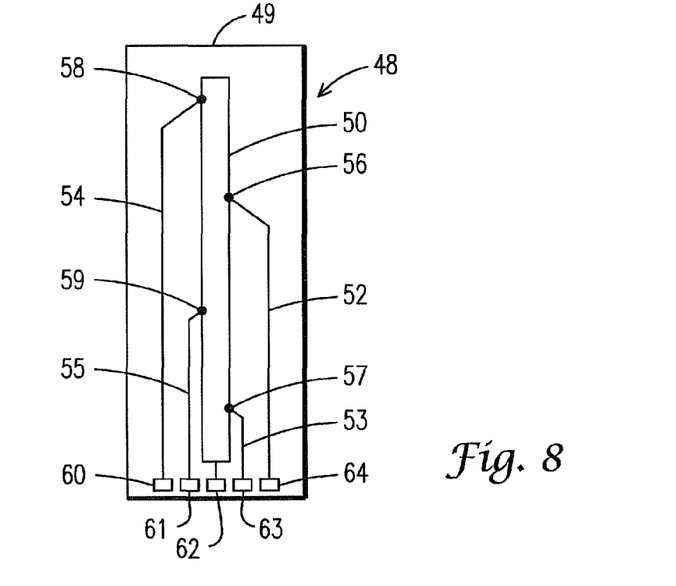
FIG. 8 is a plan view of an example embodiment of a thermocouple arrangement involving a commonly shared thermocouple leg, which is conducive to advantageous reduction of the number of interface leads needed for acquiring a number of thermal measurements from a grid of thermocouple junctions over a region of interest of a turbine component.

FIG. 8 is a plan view of an example embodiment of a thermocouple arrangement 48 involving a commonly shared thermocouple leg, which is conducive to advantageous reduction of the number of interface leads needed for acquiring a number of thermal measurements from a grid of thermocouple junctions over a region of interest of a turbine component 49, e.g., a turbine blade, a stationary vane, etc.

A first thermocouple leg 50, e.g., a thin-film thermocouple leg, may be disposed within a thickness of the turbine component. First leg 50 may be made up of a first material, such as platinum. At least two or more thermocouple legs, e.g., thin-film thermocouple legs 52, 53, 54 and 55, is each electrically connected to first leg 50 to form a grid of individual thermocouple junctions 56, 57, 58 and 59 along first leg 50 for conversion of respective thermal gradients to respective electrical signals, e.g., voltage signals. Thus, in this example embodiment, first thermocouple leg 50 constitutes a thermocouple leg shared in common by thermocouple legs 52, 53, 54 and 55.

In one example embodiment, the grid of thermocouple junctions along the first leg collectively spans a region of the component. Thermocouple legs 52, 53, 54 and 55 may be made up of a different material relative to the first material. Description of various example materials for the thermocouple legs has been provided above and will not be repeated here. It will be appreciated that such example materials should be construed in an example sense and not in a limiting sense since the topology of thermocouple arrangement 48 may be applied to any thermocouple leg materials so long as such materials generate appropriate electromotive force (emf) voltages (Seebeck principle) and further meet the applicable temperature requirements of a given turbine component.

It will be appreciated that the example thermocouple arrangement shown in FIG. 8 provides four separate electrical signals (e.g., four separate emf-generated voltages) at interface pads 60, 61, 63 and 64 relative to a common interface pad 62 connected to first leg 50 while utilizing just five interface leads (not shown), as may be connected to such interface pads. By way of comparison, traditional thermocouple arrangements, not involving a commonly shared thermocouple leg, would involve four pairs of interface leads for obtaining four different voltage measurements. It will be appreciated that this aspect of the present invention is not limited to any number of thermocouple junctions and thus the number of thermocouple junctions illustrated in FIG. 8 should be construed in an example sense and not in a limiting sense.

Figure 9:
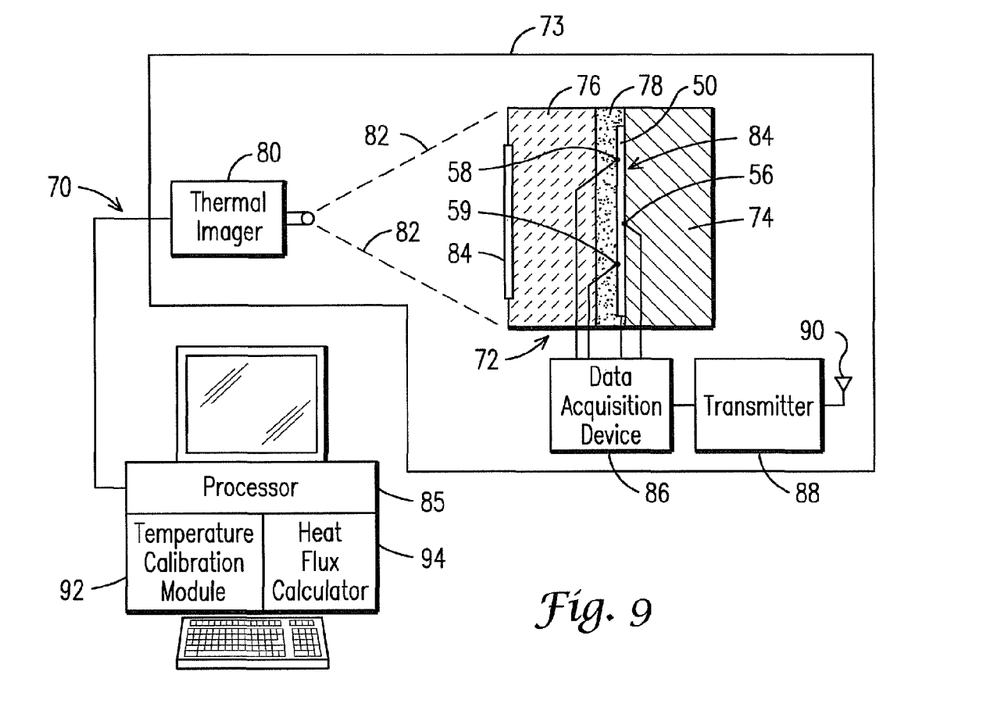
FIGS. 9-11 are schematic representations of example embodiments of respective thermocouple arrangements involving a commonly shared thermocouple leg, as shown in FIG. 8. In one example application, the respective thermocouple arrangements may be used in combination with a thermographic system to calculate heat flux over a region of interest of the turbine component.

FIG. 9 is a schematic representation of one example application of a thermocouple arrangement 84 involving a commonly shared thermocouple leg 50, as described in the context of FIG. 8. Thermocouple arrangement 84 may be used in combination with a thermographic system 70, as may be configured to calculate heat flux over a region of a turbine component 72 of a turbine 73. In one example embodiment, respective electrical signals (e.g., emf voltages) from thermocouple junctions 56, 58, 59 may be acquired by a data acquisition device 86, as may be configured to provide appropriate signal conditioning to such electrical signals, (e.g., appropriate amplification and analog-to-digital conversion), and then the conditioned data may be transmitted remote from the turbine environment by a transmitter 88 and antenna 90 using data telemetry techniques known by one skilled in the art.

Turbine component 72, as illustrated in FIG. 9 is represented by a partial cross-sectional view showing a substrate 74 covered by a barrier coating, such as a layer of a thermal barrier coating (TBC) 76 for use in the high temperature environment of the turbine. As would be readily appreciated by one skilled in the art of TBC coatings, a bond coat 78, such as a MCrAlY material may be deposited on substrate 74 prior to the application of the TBC material 76 to improve the adherence of the coating 76 with respect to substrate 74. It will be appreciated that aspects of the present invention are not limited to the example coating arrangement shown in FIG. 9 nor are such aspects limited to components having a TBC coating.

In this example embodiment, a thermal imager 80 may be arranged to sense within a field of view (as may be conceptually defined by lines 82) infrared (IR) emissions from the turbine component. In one example embodiment, thermal imager 80 may comprise a focal plane array sensor (e.g., an array of charged coupled devices (CCD)) to measure the emitted radiance of the component. To obtain the appropriate spatial resolution from a moving blade at Mach 1.2 speeds, the focal plane array sensor should be able to integrate a received IR signal within 3 microseconds or less.

For readers desirous of general background information in connection with an example thermographic system effective for online monitoring of thermal coatings, reference is made to U.S. Pat. No. 7,690,840 titled "Method And Apparatus For Measuring On-Line Failure Of Turbine Thermal Barrier Coatings". This patent describes an infrared (IR)-based system configured to non-destructively measure the radiance of a turbine component in a gas turbine in the context of monitoring the formation and progression of TBC defects where images of relative high spatial resolution are obtained but where accurate absolute temperature information may not be needed. For example, absolute temperature errors can be introduced due to various factors since, for example, the emissivity of the TBC can change as a function of wavelength, temperature, age, contamination, etc.

In accordance with aspects of the present invention, at least one patch 84 of a material having a sufficiently stable and known emissivity value over the high temperature range of turbine operation may be disposed on an outer surface of TBC 76 to derive a temperature value when within the field of view 82 of thermal imager 80. In one example embodiment, the value of the patch emissivity (E) may be relatively high (e.g. E≈0.7-0.9). Moreover, such a material should be substantially chemically stable and oxidation-resistant in the corrosive combustion environment of the turbine. That is, patch 84 may function as a stable, unpowered source of IR radiance indicative of emissivity at a patch region within the field of view of thermal imager 80. Examples of such a material may be chromium oxide, cobalt nickel oxide and platinum.

In one example embodiment, a processor 85 may be coupled to thermal imager 80 to generate a radiance map of the component based on the IR emissions from the turbine component. In accordance with aspects of the present invention, processor 85 may include a temperature calibration module 92 where the radiance map may be calibrated based on the temperature value of patch 84. This allows processor 85 to generate a calibrated thermal map of the component effective to provide absolute temperature values.

In yet another aspect of the present invention, processor 85 may further include a heat-flux calculator 94 configured to process data indicative of the electrical signals (e.g., voltages) from the grid of thermocouple junctions 56, 58, 59 relative to the temperature value of patch 84 to calculate heat flux over a region of interest of component 72, such as between the outer surface of the TBC and the thickness location of the component where thermocouple arrangement 84 is disposed.

This embodiment is advantageous because the grid of thermocouple junctions may allow determining heat flux variation over the region of the component spanned by the grid of thermocouple junctions. For example, the magnitude of the heat flux at the location of thermocouple junction 58 may be different relative to the respective heat flux magnitudes at thermocouple junctions 59 and 56. The acquisition of the electrical signals conducive to multi-location heat flux calculation can be advantageously achieved with a reduced number of interface leads, as discussed above.

Figure 10:
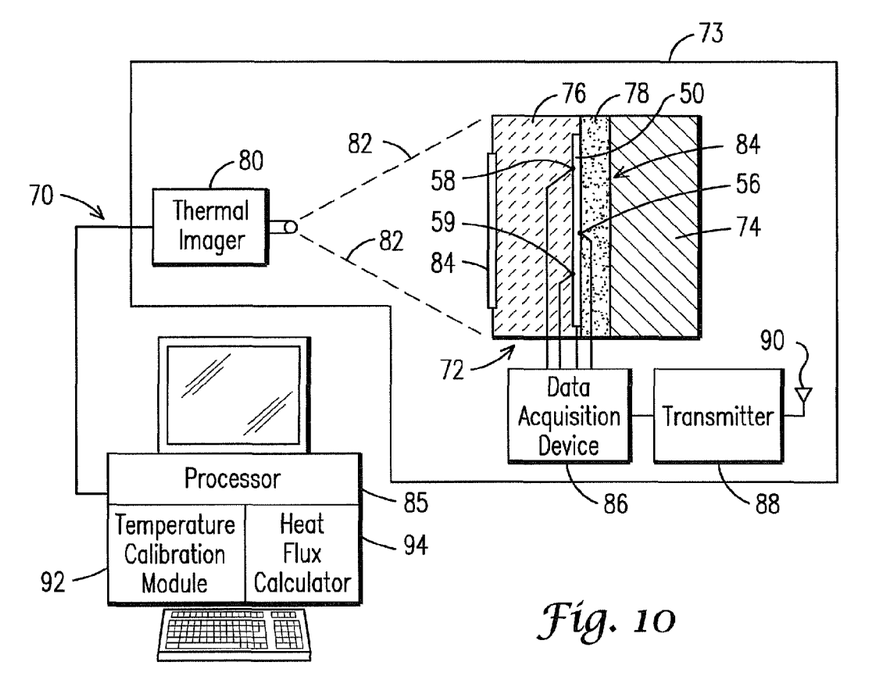
Figure 11:
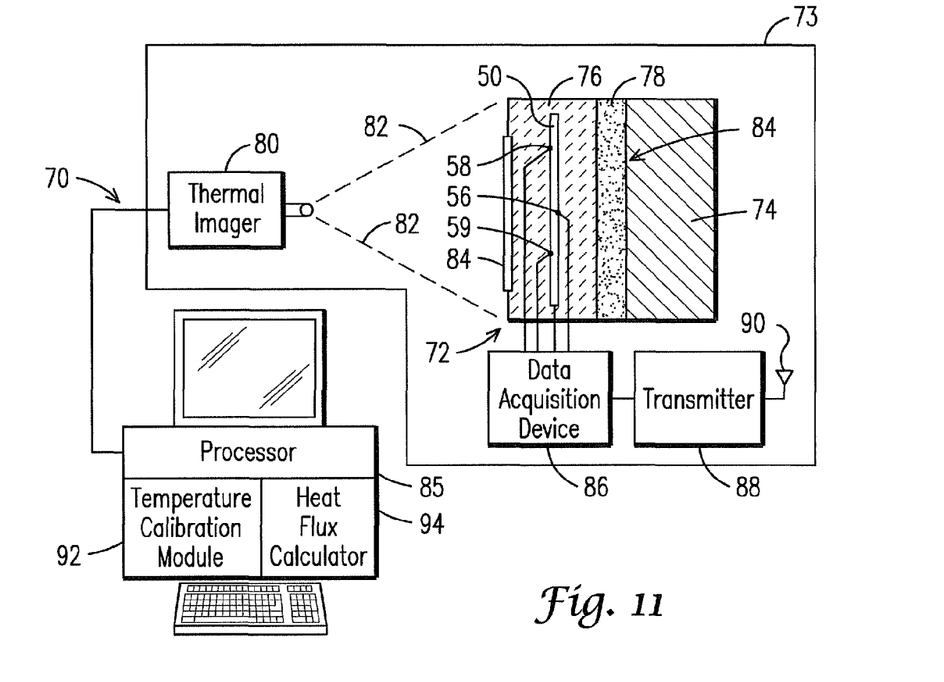

In the example embodiment shown in FIG. 9, the thermocouple arrangement is shown as located at a boundary between bond coating 78 and substrate 74. In the example embodiment shown in FIG. 10, the thermocouple arrangement is shown as located at a boundary between bond coating 78 and TBC 76. It will be appreciated, however, that thermocouple arrangement may be disposed anywhere within the thickness of the component, such as within TBC 76. For clarity of illustration, FIGS. 9-11 do not show dielectric coating that may be needed to electrically insulate the thermocouple arrangement from the surrounding material.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine component instrumented to provide a plurality of signals indicative of thermal measurements in a high temperature combustion environment of the gas turbine comprising:
    a substrate;
    a thermal barrier coating (TBC) deposited over at least a portion of the substrate;
    a thermal imager having a field of view configured to sense infrared (IR) emissions from the turbine component, wherein an emissivity of a surface of the component being mapped is subject to variation in the combustion environment of the turbine;
    at least one patch of a material having a sufficiently stable and known emissivity value to derive a temperature value when within the field of view of the thermal imager, said at least one patch disposed on an outer surface of the TBC;
    a first thermocouple leg disposed within a thickness of the component, wherein the first leg comprises a first material;
    at least two or more thermocouple legs comprising a different material relative to the first material, wherein said at least two or more legs is each electrically connected to the first leg to form individual thermocouple junctions along the first leg for conversion of respective thermal gradients to respective electrical signals, wherein the individual thermocouple junctions along the first leg of the component collectively span a region of the component; and
    a processor configured to process data indicative of the electrical signals from the thermocouple junctions relative to the temperature value of said at least one patch to calculate heat flux over the region of the component between the outer surface of the TBC and the thickness of the component.

2. The turbine component of claim 1, wherein the processor is further configured to generate a radiance map of the component based on the infrared (IR) emissions from the turbine component, the processor including a thermal calibration module configured to calibrate the radiance map based on the temperature value of said at least one patch to generate a calibrated thermal map that provides absolute temperature over the outer surface of the TBC.

3. The turbine component of claim 1, wherein said first material comprises platinum.

4. The turbine component of claim 1, wherein said different material in at least one of said at least two or more legs is selected from the group consisting of palladium, rhodium and iridium.

5. The turbine component of claim 1, wherein said different material in at least one of said at least two or more legs is selected from the group consisting of $CuAlO_2$, $In_2O_3$—$SnO_2$, $In_2O_3$—$SnO_2$ doped with ZnO, $Ga_2O_3$, $CdIn_2O_4$, $Cd_2SnO_4$, and ZnO.

6. The turbine component of claim 1, wherein the material of said at least one patch is selected from the group consisting of platinum, chromium oxide, and cobalt nickel oxide.

7. The turbine component of claim 1, wherein each thermocouple leg comprises a thin-film thermocouple leg and has a thickness in a range from 25 microns to 150 microns.

8. The turbine component of claim 1, wherein each thermocouple leg comprises a thin-film thermocouple leg and has a thickness in a range from 50 microns to 100 microns.

9. The turbine component of claim 1, wherein the thermocouple legs are disposed at a boundary between the substrate and a bond coat.

10. The turbine component of claim 1, wherein the thermocouple legs are disposed at a boundary between a bond coat and the TBC.

11. The turbine component of claim 1, wherein the thermocouple legs are disposed within the TBC.

12. A gas turbine component instrumented to provide a plurality of signals indicative of thermal measurements in a high temperature combustion environment of the gas turbine comprising:
a first thin-film thermocouple leg disposed within a thickness of the component, wherein the first leg comprises a first material; and
at least two or more thin-film thermocouple legs comprising a different material relative to the first material, said at least two or more electrically conductive thin-film legs disposed within the thickness of the component, wherein said at least two or more legs is each electrically connected to the first leg to form individual thermocouple junctions along the first leg for conversion of respective thermal gradients to respective electrical signals, wherein the individual thermocouple junctions along the first leg collectively span a region of the component,
wherein the component comprises a substrate and a thermal barrier coating (TBC) deposited over at least a portion of the substrate, wherein the TBC comprises an outer surface comprising at least one patch of a material having a sufficiently stable and known emissivity value to derive a temperature value when within a field of view of a thermal imager,
wherein data indicative of the electrical signals from the thermocouple junctions are processed in a processor relative to the temperature value of the patch to calculate heat flux over the region of the component between the outer surface of the TBC and said thickness of the component.

13. The turbine component of claim 12, wherein said first material comprises platinum.

14. The turbine component of claim 12, wherein said different material in at least one of said at least two or more legs is selected from the group consisting of palladium, rhodium and iridium.

15. The turbine component of claim 12, wherein said different material in at least one of said at least two or more legs is selected from the group consisting of $CuAlO_2$, $In_2O_3$—$SnO_2$, $In_2O_3$—$SnO_2$ doped with ZnO, $Ga_2O_3$, $CdIn_2O_4$, $Cd_2SnO_4$, and ZnO.

16. The turbine component of claim 12, wherein the material of said at least one patch is selected from the group consisting of platinum, chromium oxide, and cobalt nickel oxide.

17. The turbine component of claim 12, wherein each thermocouple leg has a thickness in a range from 25 microns to 150 microns.

18. The turbine component of claim 12, wherein each thermocouple leg has a thickness in a range from 50 microns to 100 microns.

* * * * *